United States Patent [19]

Kaufman et al.

[11] 4,339,197

[45] Jul. 13, 1982

[54] LARGE FORMAT CAMERA LIGHT BAFFLE APPARATUS

[75] Inventors: Arthur L. Kaufman, Westport, Conn.; Quentin D. Vaughan, Hollywood, Fla.; Roy G. von Dohlen, Lauderdale Lakes, Fla.; Richard Kopala, Coral Springs, Fla.

[73] Assignee: Visual Graphics Corporation, Tamarac, Fla.

[21] Appl. No.: 246,168

[22] Filed: Mar. 23, 1981

[51] Int. Cl.³ .............................................. G03B 27/36
[52] U.S. Cl. ........................................ 355/58; 355/18
[58] Field of Search ...................... 355/56, 57, 58, 18

[56] References Cited

U.S. PATENT DOCUMENTS 4,253,763 3/1981 Schleifbaum ........................ 355/58
4,310,239 1/1982 Krzyminski .......................... 355/57

*Primary Examiner*—Monroe H. Hayes
*Attorney, Agent, or Firm*—Albert F. Kronman

[57] ABSTRACT

A baffle apparatus for a large format camera to prevent non-imaging light coming from the object source and traversing the camera lens from reaching the image plane. A movable opaque baffle is disposed between the camera lens and the image plane. The object source location with respect to the lens and the required position of the opaque baffle are automatically controlled by means of cams driven by a common power source.

8 Claims, 14 Drawing Figures

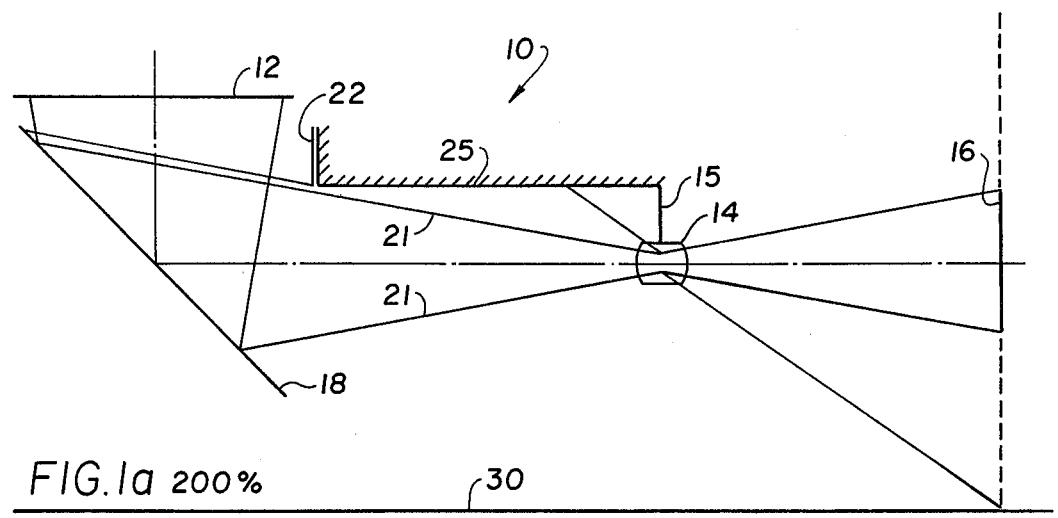
FIG.1a 200%
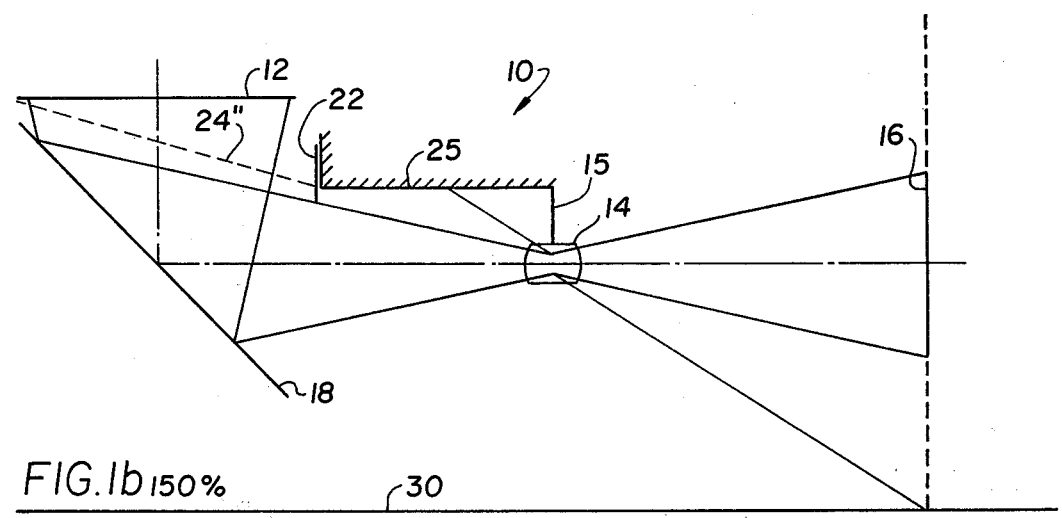
FIG.1b 150%
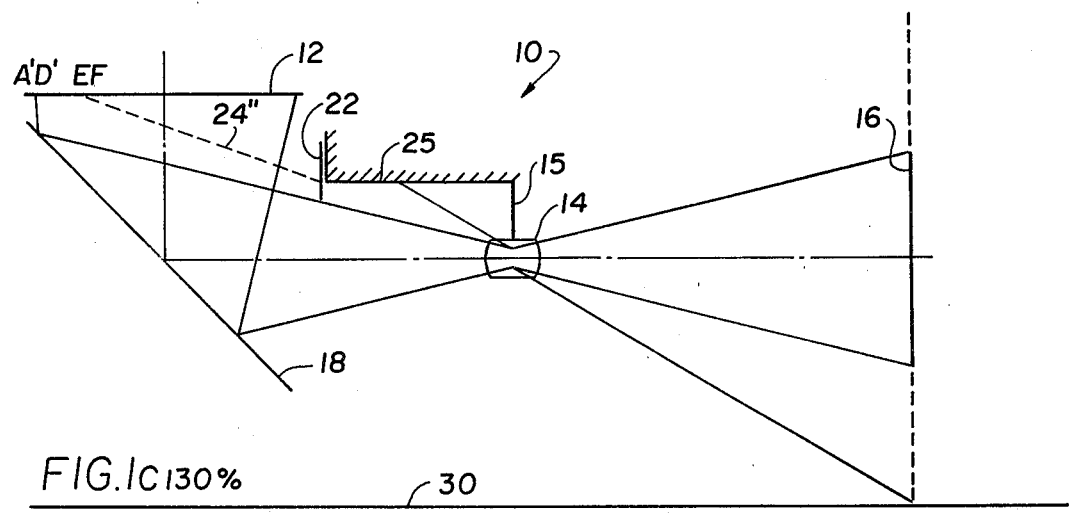
FIG.1c 130%

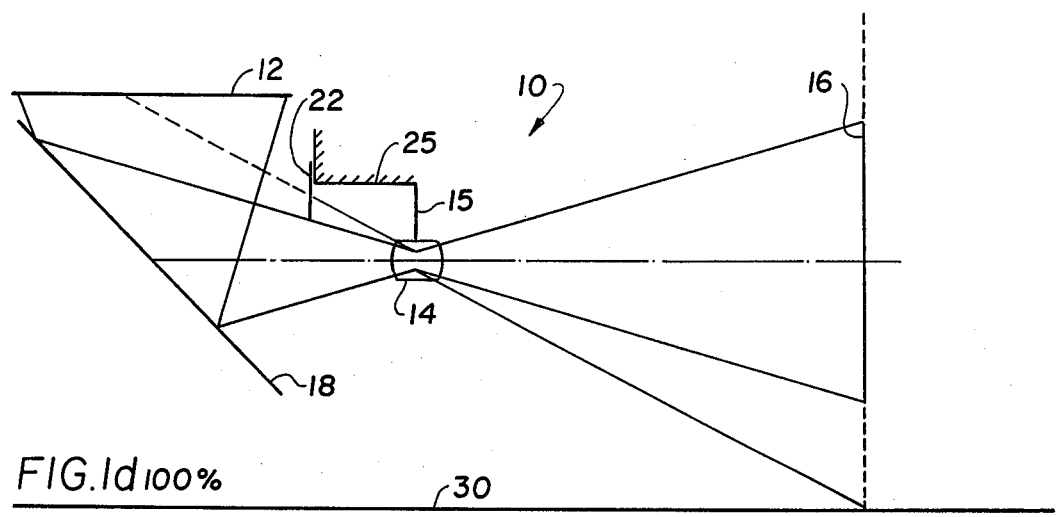
FIG.1d 100%
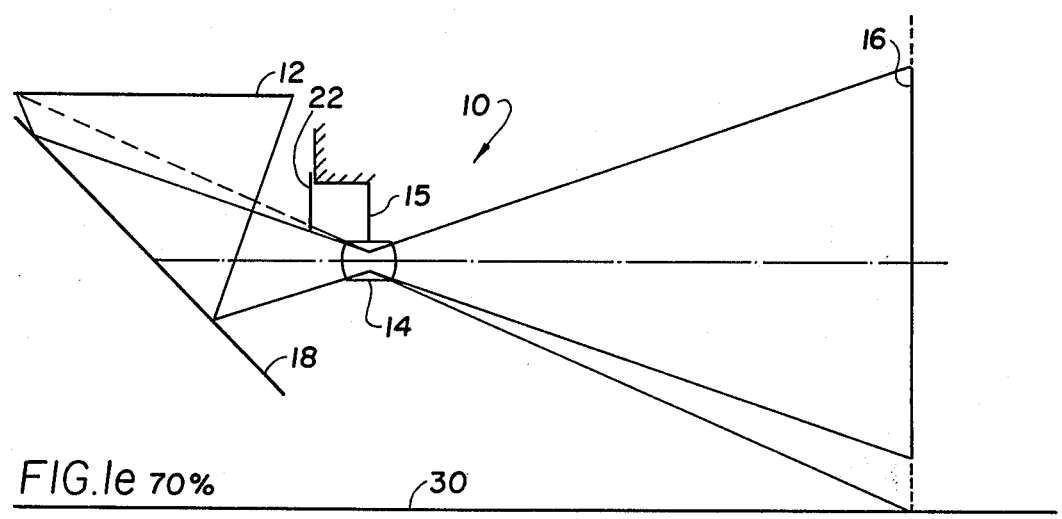
FIG.1e 70%
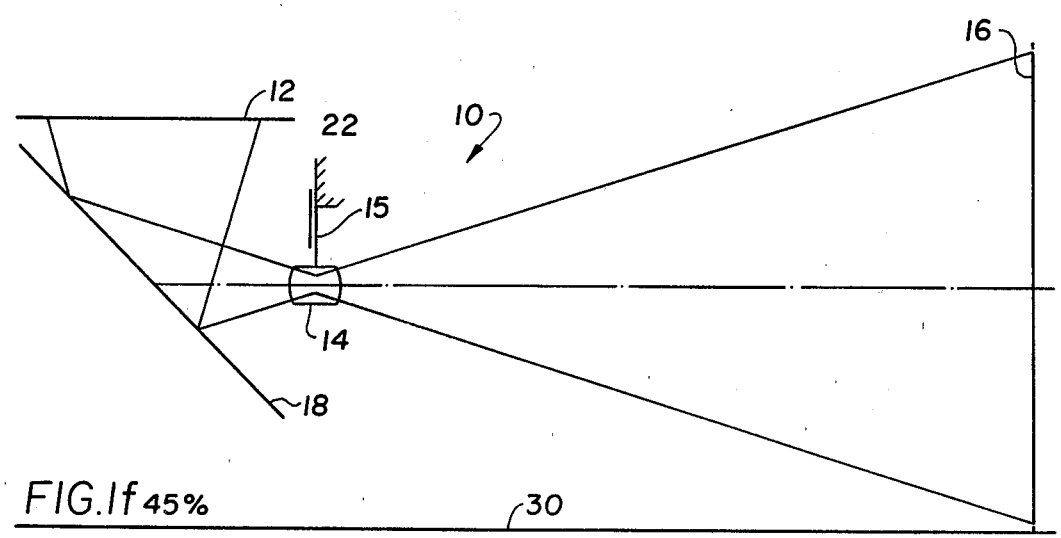
FIG.1f 45%

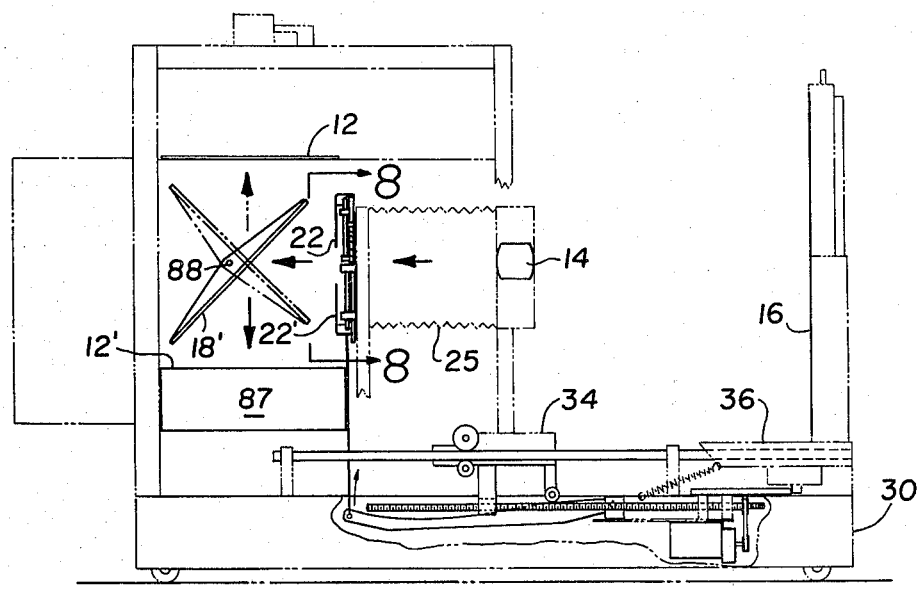
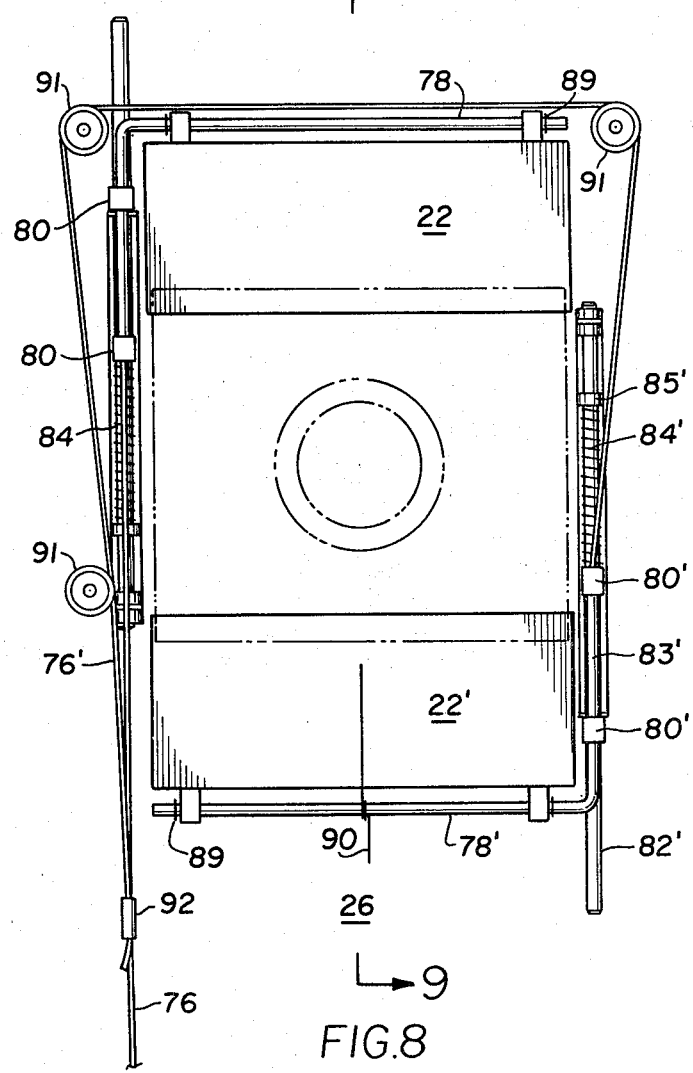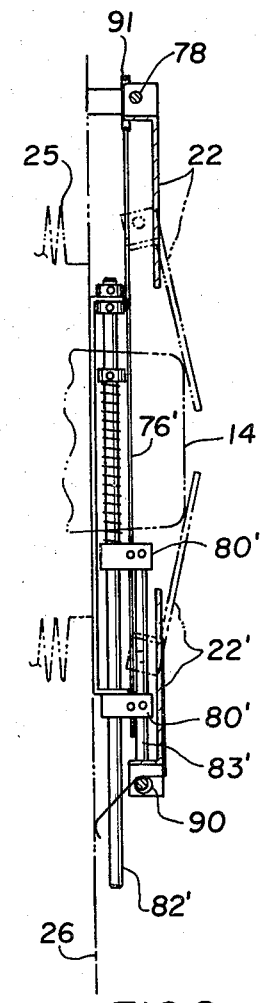
FIG.7
FIG.8
FIG.9

LARGE FORMAT CAMERA LIGHT BAFFLE APPARATUS

BACKGROUND OF THE INVENTION

Large format cameras such as industrial cameras used in the graphic arts or offset plate making cameras require the ability to vary the ratio of image size to object size depending upon the demands of specific jobs. At certain settings of the camera lens with respect to the object plane and the image plane, objectionable rays of light, hereinafter "non-imaging light", find their way from the object plane, through the lens and upon the image plane or light sensitive imaging material. Where the camera design calls for the use of a wide angle lens, the problem is often more troublesome. While baffles may be placed within the camera between the lens and the image plane, the precise location for such baffles as the camera is changed from one ratio to another is difficult and time consuming. Nor is it possible to use a fixed baffle for nonimaging light without blocking imaging light at some desired ratio.

Accordingly, it is an object of the present invention to provide a baffle apparatus for a large format camera which will prevent non-imaging light from reaching the image plane at all settings of the camera.

Another object of the present invention is to provide a baffle apparatus which will be positioned automatically by the relative movement of the object source and the lens.

A further object of the present invention is to provide a positive acting, accurate mechanism for positioning an adjustable baffle within a camera to intercept non-imaging light coming from the camera lens.

A feature of the present invention is its use of a non-imaging light intercepting baffle which is automatically raised or lowered at each camera adjustment into the path of said light.

Another feature of the present invention is its use of cams linking the supports for the object source and the camera lens to the baffle so that these elements are all actuated at the same time.

SUMMARY

The invention relates to a large format camera having an elongated base, a first carriage longitudinally movable upon the base, a lens and lens support on the first carriage, a second carriage longitudinally movable upon the base, an object source support on the second carriage, a light tight housing within which there is at least one image plane to receive light coming through the camera lens and a bellows between the said lens and the interior of the light tight housing. A non-imagine light obscuring baffle is located within the camera housing between the lens and the image plane. The position of the baffle at each adjustment of the camera is controlled by an elongated cam and follower operatively coupled to the baffle. Another cam on the base serves to move the second carriage. A common source of power controls the simultaneous adjustment of the position of the camera lens, the baffle and the object source for each desired ratio of object to image size.

BRIEF DESCRIPTION OF THE DRAWINGS

In the accompanying drawings forming part hereof similar parts have been given the same reference numbers in which drawings;

FIGS. 1a–1f are diagrammatic views of the optical path of light rays controlled in accordance with the present invention.

FIG. 7 is a view similar to FIG. 3 on a reduced scale showing a camera with two spaced parallel image planes and a double baffle, a further embodiment of the present invention.

FIG. 8 is a view taken on line 8—8 of FIG. 7, somewhat enlarged, looking in the direction of the arrows.

FIG. 9 is a cross sectional view taken on line 9—9 of FIG. 8.

Referring to FIG. 1a, there is shown the basic elements of a camera namely; an image plane 12, a lens 14, and an object plane 16. In the camera of the present invention a mirror 18 is disposed between the lens 14 and the image plane 12 in order to fold the optical path, correct left right imaging and also to facilitate handling of photosensitive material upon the image plane.

Figure 2:
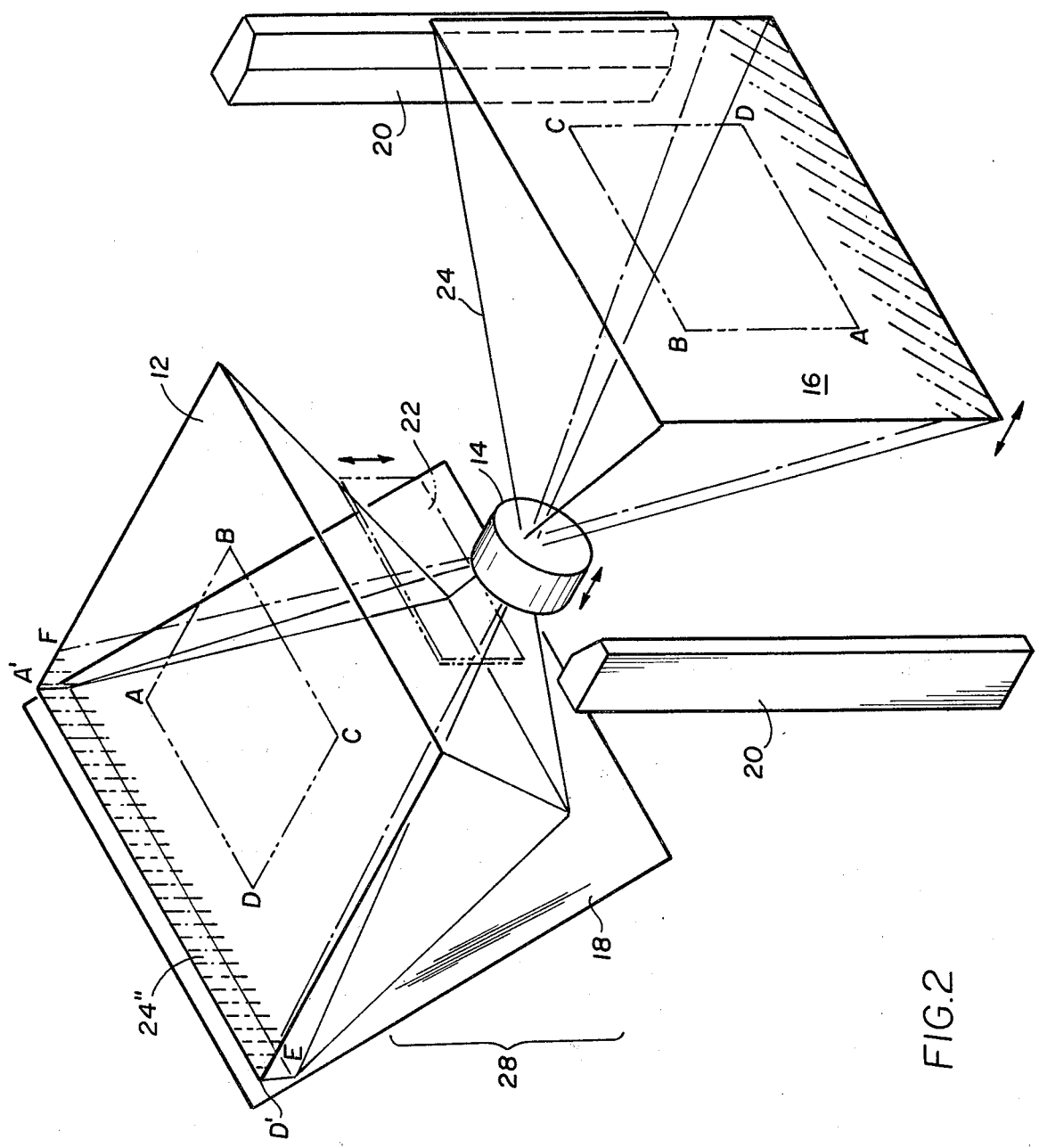
FIG. 2 is a somewhat diagrammatic isometric view of a camera made in accordance with the present invention.

The diagrammatic showing of FIG. 1a represents a 200% ratio between the original copy (not shown) which is placed on the object plane 16 and the image projected upon the image plane 12. It is to be understood, as hereinafter more fully described, that lights 20 (shown in FIG. 2) are employed to illuminate the material on the object plane for this purpose. The lens 14 in the camera is carried upon a lens board 15 secured to the movable end of a bellows 25. At this ratio all of the light passing through the lens 14 and indicated by the lines 21 will be received directly upon the image plane 12 without the presence of non-imaging light.

In FIG. 1b the lens 14 has been advanced to provide a 150% ratio. At this position it will be seen that although the baffle 22 has been moved to block non-imaging light 24" coming from the bottom of the object plane 16, the configuration of the camera elements would prevent such light from reaching the image plane without the baffle.

As the lens 14 is further advanced in the direction of the image plane, as shown in FIG. 1c, the problem of non-imaging light increases so that such light would fall upon the image plane in the area indicated by the letters A'D'E F. However, by interposing the baffle 22, in the manner shown, these rays can be prevented from reaching the image plane. FIGS. 1d–1f illustrate other lens positions in the camera and the resulting non-imaging problem together with the required baffle locations.

Referring to FIG. 2 there is shown, somewhat diagrammatically, an object plane 16 in the form of a copy board upon which the material to be copied is shown as dashed lines A,B,C,D. The copy board 16 is illuminated by lights 20. Rays of reflected light 24 from the entire copy board enter the lens 14 and are directed into the light tight housing 28 of the camera, reflected by the mirror 18 and appear as an image ABCD on the image plane 12. The rays of light coming from that portion of the object (copy board) outside of the area within dashed lins A,B,C,D will also appear upon the image plane as non imaging light D'A'E and F. The interposition of the baffle 22, however, can eliminate the effects of the non-imaging light.

Figure 3:
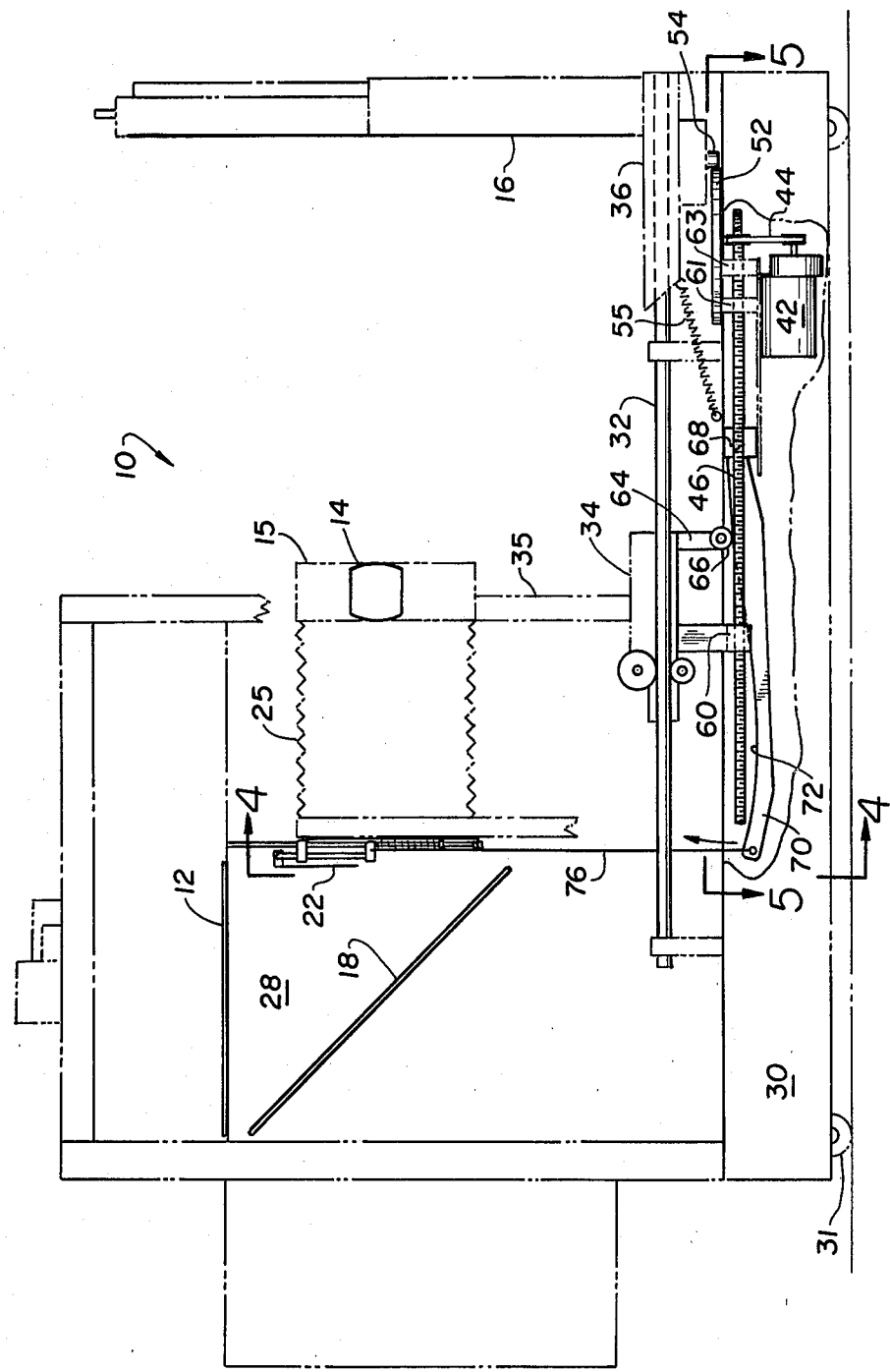
FIG. 3 is a somewhat diagrammatic view in side elevation of the camera made in accordance with the present invention with certain parts broken away and other parts shown in phantom for the purpose of clarity.
Figure 5:
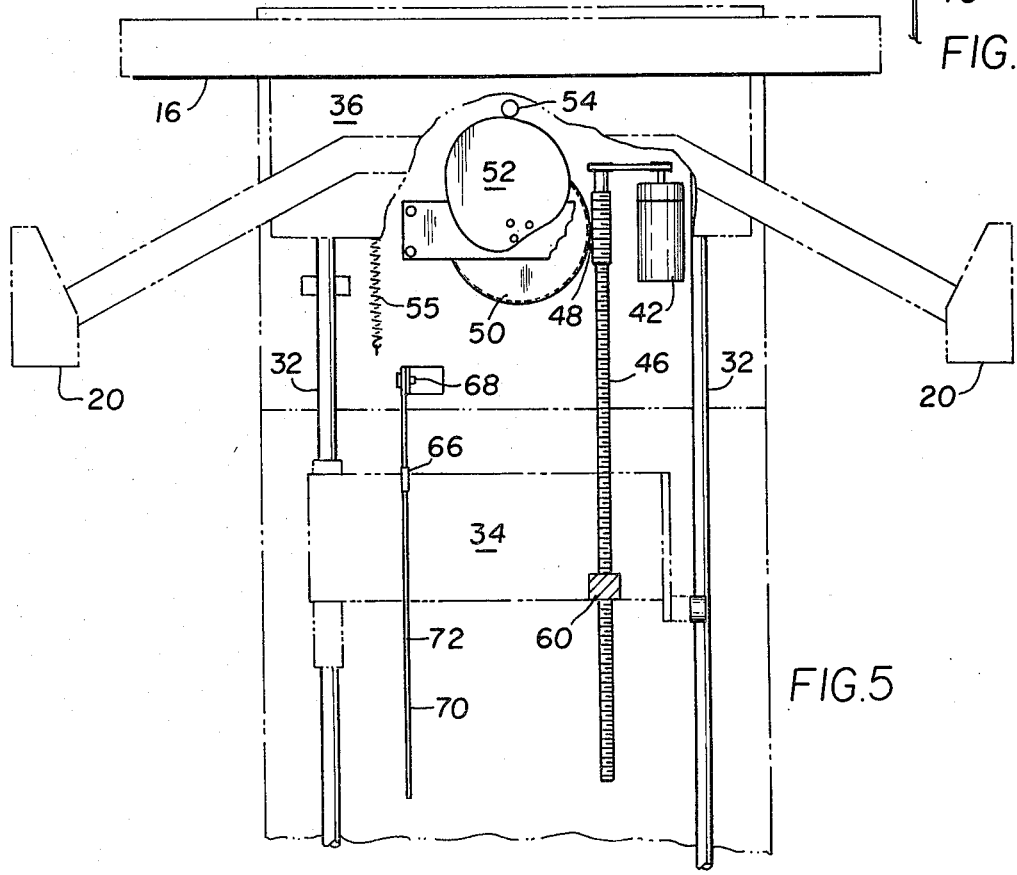
FIG. 5 is a plan view taken on line 5—5 of FIG. 3.

The somewhat diagrammatic view of a complete embodiment of the present invention shown in FIG. 3 illustrates a camera 10 built upon a base 30 mounted upon wheels 31 so that it may be moved from place to place as desired. Spaced elongated tracks 32 (best shown in FIG. 5) are supported upon the base 30. A first carriage 34 and a second carriage 36 ride upon the tracks 32 so that they can longitudinally traverse the base 30. The first carriage 34 secures the support 35 for the lens board 15 and the camera lens 14. The second carriage 36 serves as a mount for the object plane 16 which is shown as a copy board. A drive means which includes a source of rotary power 42, a pulley and belt 44, and an elongated threaded shaft or lead screw 46 is operatively coupled to the first and second carriage by means of internally threaded depending legs 60, 61, 63. The leg 60 is attached to the first carriage and the legs 61, 63 are attached to a cam 52 by way of a worm gear drive 48. The cam 52 bears against a pin 54 which constitutes a follower secured to the second carriage. By means of this arrangement the position of the copy board with respect to the lens is adjusted for each rotation of the lead screw. An elongated cam 70 is disposed below the tracks 32 as shown in FIGS. 3 and 5. The cam 70 is pivotally mounted in a bracket 68 and its free end is attached by means of a cable 76 to a baffle member 22 which is positioned between the lens 14 and the reflecting mirror 18 at the end of the bellows 25 opposite the lens 14.

Figure 4:
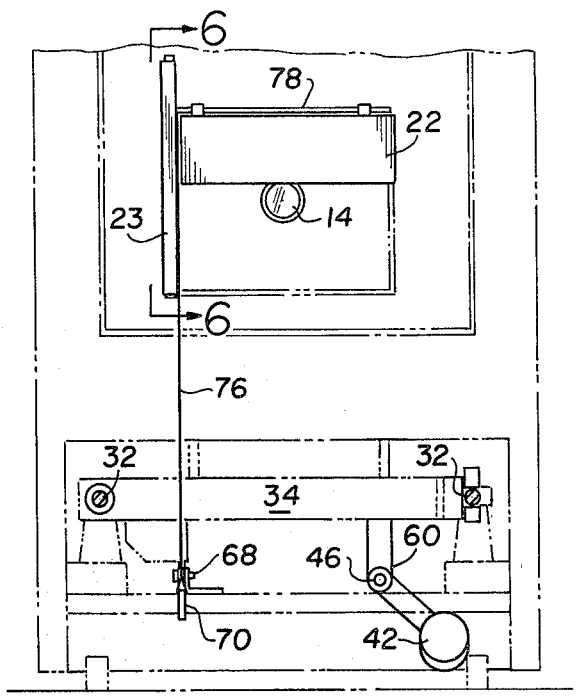
FIG. 4 is a sectional view taken on line 4—4 in FIG. 3.
Figure 6:
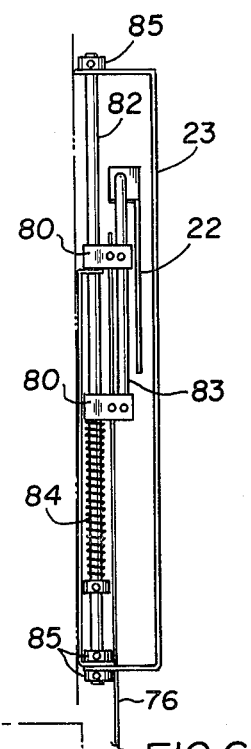
FIG. 6 is a view taken on line 6—6 of FIG. 4, somewhat enlarged.

The baffle member as best shown in FIG. 6 is contained within a frame 23 having spaced rods 82 carried vertically thereon. Blocks 80 on the rods are bored so that they may slide freely upon the rods 82. The blocks comprise an upper set and a lower set and are coupled together by means of shafts 83. Collars 85 are secured to the rods 82 and coil springs 84 are placed between the collars 85 and the blocks 80 so that the blocks are spring loaded in an upward position. An opaque baffle 22 is secured to a transverse support rod 78 carried at each end by the shafts 83. The baffle 22 extends downwardly and at its upper limit is disposed above the lens 14 as shown in FIG. 4.

A cam follower 66 which is carried at the lower end of the small leg 64 which in turn is attached to the first carriage 34 rides upon the elongated cam 70. The cam 70 is provided with a cam surface 72 of a contour which will control the position of the baffle automatically as the first carriage 34 is moved longitudinally along the tracks 32. The cam surface 72 is computed so that for each position of the carriage 34 the baffle will be disposed in the path of non-imaging light entering the camera lens 14.

Referring to FIG. 7 there is shown a camera made in accordance with the present invention in which the light from the object plane 16 is directed downwardly, by rotating the mirror 18, onto a horizontal image plane 12'. For this embodiment it is necessary to provide a baffle for non imaging light which may be directed downwardly toward the horizontal image plane 12'. A double baffle 22, 22' best shown in FIGS. 8 and 9 is provided for this purpose. The operation of this baffle is the same as that herein above described for baffle 22 except that a second springloading structure 84' is provided to return the two baffles 22, 22' to their non blocking position when such blocking is not necessary. It will be seen that the elongated cam 70 and cam follower 66 will serve to position the lower baffle 22' as the object support is moved along the tracks.

Having thus fully described the invention, what is claimed and desired to be secured and protected by Letters Patent is as follows:

1. Apparatus for blocking non-imaging light entering a large format camera, said camera having an elongated base, an object plane adjustably carried at one end of the base, a fixed image plane supported by the base and spaced from the object plane, and a lens supported by the base between the object and image planes and adjustable along its optical axis and a mirror between the lens and the image plane comprising:
   a. at least one elongated track member carried by the base and parallel to the optical axis of the lens;
   b. a first carriage slidably received upon the track member;
   c. means to couple the camera lens to the first carriage;
   d. a second carriage slidably received upon the track member;
   e. means to secure the object plane to said second carriage;
   f. a cam having a cam face rotatably carried by the base;
   g. a cam follower carried by the second carriage in operative contact with the cam face;
   h. means to urge the cam follower into contact with the said cam face at all times;
   i. an opaque substantially planar baffle member within the camera positioned adjacent the lens and slidable into the path of a selected portion of the light rays traversing the lens;
   j. an elongated cam swingably carried by the base at one end and coupled to the baffle member at is free end;
   k. a cam face on said elongated cam;
   l. a cam follower secured to the first carriage in operative contact with the elongated cam face;
   m. a power source on the camera base;
   n. and driven means operatively coupled to the power source to simultaneously move the first and second carriages; whereby the baffle will be placed in the path of non-imaging light as it leaves the lens for each setting of the object plane and lens upon the base.

2. Apparatus according to claim 1 in which the means for coupling the camera lens to the first carriage includes a lens board and an upstanding support.

3. Apparatus according to claim 1 in which the baffle is mounted upon spaced rods to move along a path substantially normal to the optical axis of the lens.

4. Apparatus according to claim 3 in which the baffle is spring loaded to return to a position beyond the camera lens when no non-imaging light would fall upon the image plane.

5. Apparatus according to claim 1 in which the cam follower for the elongated cam is secured to the first carriage by a depending leg.

6. Apparatus according to claim 1 in which the power source is a motor coupled to an elongated lead screw.

7. Apparatus according to claim 1 in which the driven means includes a rotatable cam on the base and a worm and gear drive.

8. Apparatus according to claim 1 in which spaced, parallel first and second image planes are disposed at right angles to the object plane, the mirror is rotatably carried for directing the light upwardly upon the image plane or downwardly upon a horizontal image plane and the baffle member is formed with spaced vertically movable opaque portions disposed on each side of the optical axis of the camera lens.

* * * * *